United States Patent
Kumar et al.

(10) Patent No.: US 6,597,919 B1
(45) Date of Patent: Jul. 22, 2003

(54) OPTIMAL RADIO CHANNEL ALLOCATION IN A DISTRIBUTED CONNECTION AND TRANSPORT NETWORK

(75) Inventors: Surender Kumar, Schaumburg, IL (US); James Mathis, Barrington, IL (US); Bhavesh G. Patel, Naperville, IL (US); Gary J. Aitkenhead, Bramley (GB); Mark Shaughnessy, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 225 days.

(21) Appl. No.: 09/602,327

(22) Filed: Jun. 23, 2000

(51) Int. Cl.[7] .......................... H04Q 7/00; H04B 7/204; H04L 12/54

(52) U.S. Cl. ...................... 455/510; 455/452; 455/445; 370/230

(58) Field of Search ................................. 455/445, 452, 455/453, 454, 509, 510, 512, 513, 515, 516, 517, 526; 370/229, 230, 412, 443, 444, 447, 462

(56) References Cited

U.S. PATENT DOCUMENTS

| | | | | |
|---|---|---|---|---|
| 5,054,109 A | * | 10/1991 | Blackburn | 455/512 |
| 5,748,901 A | * | 5/1998 | Afek et al. | 370/229 |
| 5,828,653 A | * | 10/1998 | Goss | 370/230 |
| 5,886,980 A | * | 3/1999 | Zheng | 370/230 |
| 5,886,984 A | * | 3/1999 | Abu-Amara et al. | 455/454 |
| 6,205,150 B1 | * | 3/2001 | Ruszczyk | 370/412 |

* cited by examiner

Primary Examiner—Lester G. Kincaid
(74) Attorney, Agent, or Firm—Steven R. Santema; Terri S. Hughes

(57) ABSTRACT

A method and system for optimal radio channel management in a distributed connection and transport network. The method includes the steps of determining the quality of service required by a communication session, determining whether transport resources are available for immediate use by the communication session, and queuing the communication session for assignment to transport resources in accordance with the quality of service required and the availability of transport resources for immediate use. The system includes a set of assignable transport resources, an interface for requesting a communication session, a detection processor in communication with the interface for determining the quality of service required by the session, a resource processor in communication with the detection processor determining whether transport resources are available for immediate use by the session, and a queuing processor in communication with the resource processor holding the communication session for prioritized allocation to the transport resources.

27 Claims, 3 Drawing Sheets

OPTIMAL RADIO CHANNEL ALLOCATION IN A DISTRIBUTED CONNECTION AND TRANSPORT NETWORK

FIELD OF THE INVENTION

This invention relates in general to communication resource management. In particular, the invention relates to a method and system for optimal radio channel management within a distributed connection and transport environment or any network having channelized resources.

BACKGROUND OF THE INVENTION

In existing radio communication systems, various subsystems necessary for operation of the main system are integrated into a partitioned architecture. Such subsystems, or planes, may include an application subsystem, a services subsystem, a connections subsystem and a transport subsystem. The transport subsystem typically includes radio transport resources. The radio transport resources, otherwise known as radio channels, are allocated at the time a call is originated, and they remain allocated according to this setup throughout the duration of the call. The availability of these resources for use by other calls depends directly on the amount of active traffic being carried simultaneously by other channels.

An active call may not require transport resources at all times, however. For example, pauses between words or sentences during speech communication constitute discrete time periods where no important signals or data need be carried. As another example, a service may be active and resources are assigned but not being used, such as in the set-up phase of a call. These unused resources, which could be utilized to support more active calls, are essentially wasted during these pause periods.

Some wireline access packet switching protocols, for example, the protocol known as "Frame Relay," provide for access contention and flexible reservation of resources using the concept of "committed information rate." The frame relay protocol is typically utilized in wide area networks, such as those connected through public networks and leased lines having data transfer rates of at least 56 Kbps. Committed information rate requires a user to pre-commit to a certain average maximum data transmission rate for the duration of the communication session. The information rate refers to the average maximum transmission speed that the user utilizes over a frame relay link, and the customer may increase the transmission rate (typically in increments of 16 Kbps) through the network as the user's port allows. The committed information rate concept, however, relates only to flexible information rate reservation and the maximization of transmission rate for the full duration of a call session. These solutions do not address the dynamic allocation of transport resources for the purpose of increasing overall utilization on a network. Furthermore, present resource reservation and allocation schemes are not effective to increase the apparent service capacity of a system.

DETAILED DESCRIPTION OF THE PREFERRED EMBODIMENTS

Figure 1:
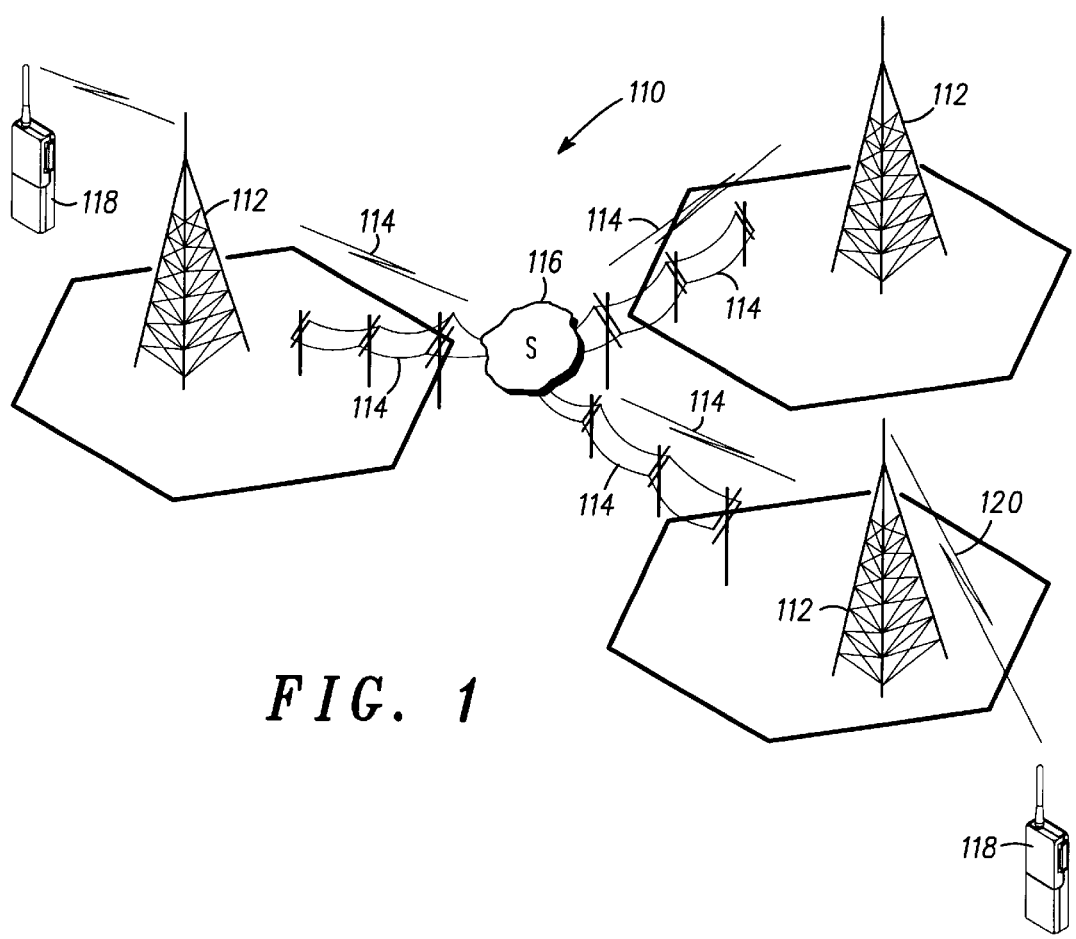
FIG. 1 is a schematic diagram illustrating a land-based radio communications network implementing the present invention.

To alleviate some of the problems associated with the prior art, a method and system are provided herein for optimal radio channel management in a distributed connection and transport communication environment.

In one aspect of the present invention, a method of providing a connection for a communication session is provided. The connection includes a portion of a set of connection and underlying transport resources. The method includes the steps of determining the quality of service required by the communication session, determining whether the transport resources are available for immediate use by the session, and queuing the communication session for assignment to transport resources.

The communication session is then assigned resources in accordance with the quality of service required by the communication session and the availability of transport resources for immediate use by the communication session.

In another aspect of the invention, a method is provided for allocating transport resources for a communication session. The method comprises the steps of requesting a quality of service for the communication session, determining whether transport resources are available for immediate use by the session, and prioritizing the communication session for assignment to a connection. The prioritization is made in accordance with the quality of service required by the communication and the availability of transport resources.

The invention may also be embodied in a system for allocating transport resources for a communication session. The system includes a set of assignable transport resources within a communications network and an interface for requesting a communication session using the network. A detection processor is included to determine the quality of service required by the communication session. A resource processor is also included and is linked with the detection processor. The resource processor determines whether transport resources within the network are available for immediate use by the communication session. A queuing processor is also provided in communication with the resource processor. The queuing processor holds the communication session for prioritized allocation to a portion of the transport resources. The prioritized allocation is made in accordance with the quality of service required by the communication session and the availability of transport resources.

The method and system disclosed herein provides for dynamic re-allocation based on requested quality of service on a service instance-by-service instance basis. By overbooking of resources at the time of connection setup depending on the quality of service required by the service subsystem, this method and system provide for efficient transport allocation in the context of newer decoupled communications system architectures. Through the overbooking, the method and system also allow the offered service capacity of a system to be elevated over 100% of the actual system capacity. Furthermore, the present method and system are capable of handling pools of equally capable resources that can be called upon as needed to serve the required quality of service of calls.

FIG. 1 is a schematic diagram illustrating a radio transmission network implementing the method and system and the present invention.

The system 110 includes a plurality of radio reception station (which includes antennae, radio transceiver equipment, and control equipment) 112 located remotely from each other in a wide-area network. The stations 112 are preferably interconnected via conventional land-line or wireless routes 114, which in turn interconnect through a plurality of various switching elements (which may include circuit, packets, or frame switches or routing elements) 116 as shown in the diagram. The plurality of switching elements 116 may be interconnected via various topologies, such as "star", "mesh", "ribbon". Each station 112 is preferably capable of receiving and transmitting to mobile or portable radio units 118 via wireless communication resources 120.

The user of a radio unit 118 may communicate by voice by depressing a "talk" button on his radio unit to initiate transmission to the respective station 112. Upon release of the talk button, the radio unit 118 is capable of receiving transmissions from the station. Some types of radio units are capable of transmitting and receiving other types of data, such as binary or alphanumeric text information, or packet data containing a significant amount of multiplexed information. The software that allows interconnection of the communication system 110 may be run from the element 116 or other areas within the system 110.

Figure 2:
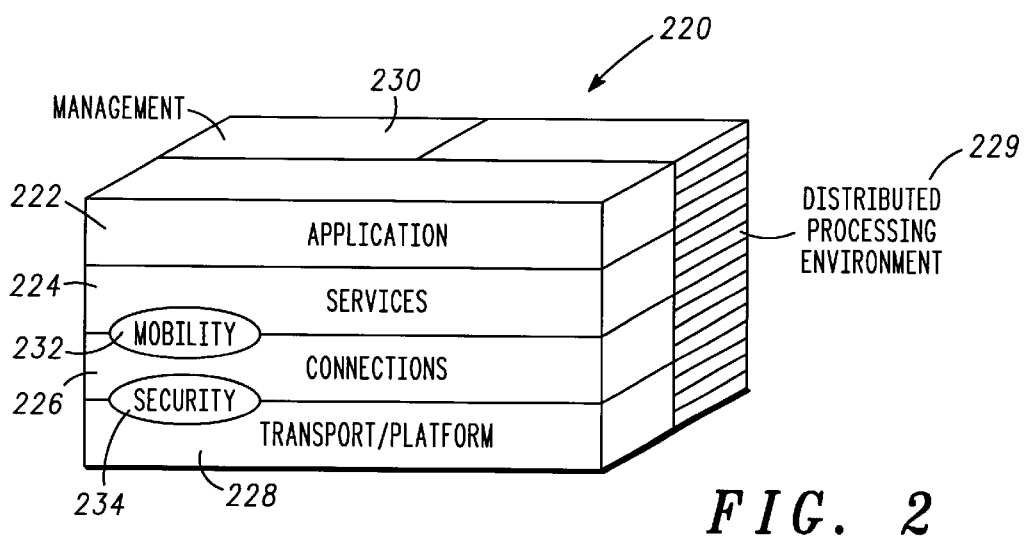
FIG. 2 is a schematic diagram illustrating the interrelationship among various subsystems in a decoupled communication system architecture which implements the present invention.

The following description of the preferred embodiment presumes a communication system software architecture that includes service processing functionality, connection processing functionality, and transport resources. This architectural partitioning is illustrated in the diagram of FIG. 2. As shown in the diagram, the communication system 220 includes an application subsystem 222, a services subsystem 224, a connections subsystem 226 and a transport/platform subsystem 228. A distributed processing environment 229 extends across the subsystems 222, 224, 226 and 228 along with a management subsystem 230.

The application subsystem 222 runs particular data-handling and device-specific software and interfaces that software with the remainder of the system 220. The transport/platform subsystem 228 runs the technology-dependent hardware tasks. The service subsystem 224 provides processing services and coordinates call control, where all calls are handled independently from the application subsystem 222. The connections subsystem 226 accepts connection requests from the service subsystem 224 and arranges for the proper transport resources needed to transfer user information.

In the preferred radio communication system 220, a distributed connection subsystem 226 may use the services of the distributed transport subsystem 228 to provide allocated resources to the service subsystem 224. In the connection subsystem 226, the transport elements can be abstracted and considered as logical resources. These logical resources are mapped indirectly to physical resources in the transport subsystem 228. The transport subsystem 228 handles the direct management of these transport elements. Depending on the quality of service ("QoS") demanded by the service subsystem 224 to support an incoming call or communication session, the connection subsystem 226 may or may not be able to guarantee that traffic-carrying transport resources will be available when needed. Logical resource over-booking may therefore be applied wherein the connection subsystem 226 may allow more active connections (based on demands from the service subsystem 224) than there are actual transport resources actually available to simultaneously carry traffic for all of the connections. This concept relies upon the probability that an active connection will not always require transport resources. This probability is reflected in the QoS parameter the service subsystem 224 uses when requesting a new connection. With careful monitoring of the transport usage by the transport subsystem 228 and by having the transport subsystem 228 provide feedback to the connection subsystem 226, the degree of over-booking can be adjusted dynamically to ensure that the QoS requirements of the service subsystem 224 are met.

Figure 3:
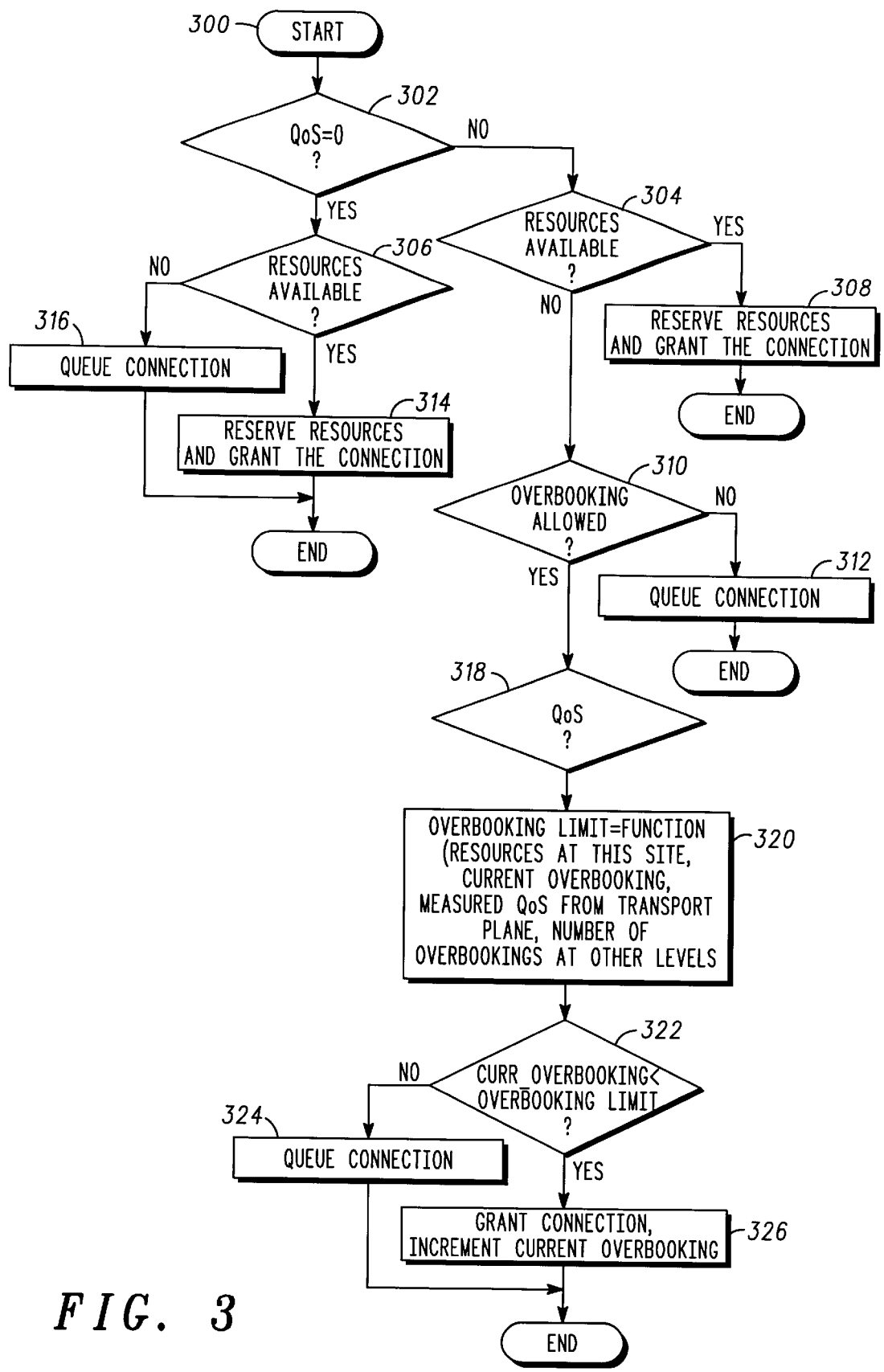
FIG. 3 is a flow diagram illustrating a method of the present invention.

FIG. 3 depicts one preferred embodiment of a connection and transport processing method of the present invention. The process starts at step 300 after the connection entity has received a request for a communication session from the service entity, which in turn had received a request from an interface with the user. The request preferably includes information relevant to the connection such as type, required quality of service and bandwidth. In one embodiment, levels of QoS provided are identified by the ordered set, 0 through N, where 0 represents the highest level. Other QoS identification schemes are possible such as simply naming each, without any particular order, though the relative level of each would be known.

Step 302 determines if the requested quality of service and bandwidth level is 0 (in this example, the numeric level 0 represents the highest level; no resource overbooking is allowed.). If so, then processing proceeds to step 306 where a determination is made as to whether required transport resources are available for immediate use by the session. If they are, the resources are reserved and the connection is granted at step 314. If resources are not available, the connection request is queued (held) until resources become available at step 316, or a timer expires, or the service request is withdrawn.

If the requested quality of service is greater than level 0 (i.e. lower quality) at step 302, then processing continues to step 304 where a determination is made as to whether required transport resources are available for immediate use. If they are, processing continues to step 308 where the necessary resources are reserved and the connection is granted. If the resources were not available at that moment, then a determination is made at step 310 as to whether the system has been configured to allow overbooking. This step allows the system operator to decide on a more global basis whether the system should or should not support overbooking. If the system should not support overbooking, then processing continues to step 312 where the connection request is queued until resources become available, or a timer expires, or the service request is withdrawn.

If overbooking is allowed in the system, processing continues to step 318 where the actual level of QoS that was included in the request is evaluated. For each level, a different algorithmic resource assignment function may be executed. For example, the calculation may be a function such as:

Overbooking limit=Function(Resources at this site, Current Overbooking, Measured QoS from Transport Plane, number of overbooked connections at other levels)

This function may include defined parameters (such as resources at the site), measured parameters (such as measured QoS from the transport plane), and/or predicted parameters (such as expected impact from other QoS level decisions).

In this example, assuming a QoS=2 is included in the request which indicates a desired level of packet drop rate to not exceed 1%. The QoS=2 path is followed to step 320 where the overbooking limit for this QoS is calculated. Assume the site has transport resources for 12 channels and resources are dynamically assigned when traffic is received at the site. The current overbooking level is 110%; that is 110% of 12 channels (or 13 channels) may be assigned. Over the last few minutes, the measured rate of not assigning a resource on demand and thus dropping packets has been 0.1%. Since the system is operating well within the 1% maximum drop rate for QoS=2, the overbooking limit is increased to 120% allowing the acceptance of service requests for 14 channels when only 12 channels exist.

Continuing with this example, at a later time another QoS=2 request is received and again step 320 is performed and the overbooking limit for this QoS is calculated. The number of channels is still 12, and the current overbooking is 120%, but because of requests at other QoS levels, the measured packet drop rate has risen to 2%. Because this significantly exceeds the desired QoS=2 rate of 1%, the overbooking limit is decreased to 90% or only accepting service requests for 11 channels when 12 channels exist. In this case, the function actually underbooks the resource to compensate for requests at other QoS levels and higher priorities.

Note that if this evaluation is performed, for example, for a QoS 3, the function preferably would include as part of its factors the number of overbookings of QoS level 2.

At step 322, a determination is made whether an incremented overbooking limit has been exceeded for this level of QoS. If the limit has not been reached, the connection is granted at step 326 and a counter that is tracking current overbooking is incremented. At this point the connection is actually waiting in the "overbooked" or primary queue for an opportunity to borrow or be assigned an actual transport resource. From the perspective of the service requester, however, the connection is active and granted.

If, at step 322, the overbooking limit had been exceeded, then processing continues to step 324 where the connection request is held in a secondary or "connection" queue until either resources become available or the overbooking limit is no longer exceeded.

While traffic is flowing, the particular connection in use can be considered to be in an active state. If the transport subsystem 228 detects a loss of traffic (i.e. no traffic packets have appeared within a certain time period), the system may release the channel and suspend the connection without the connection subsystem 226 informing the service subsystem 224. This, for example, occurs when there are natural breaks in speech communications. In this state, the transport resources being used by the connection subsystem 226 are made available for other connections. The transport subsystem 228 can attempt to resume the connection when traffic starts to flow again for the suspended connection. Therefore, the transport subsystem 228 may activate and release the resources as a result of transport-specific conditions, such as presence and disappearance of traffic, without any service subsystem interaction.

Figure 4:
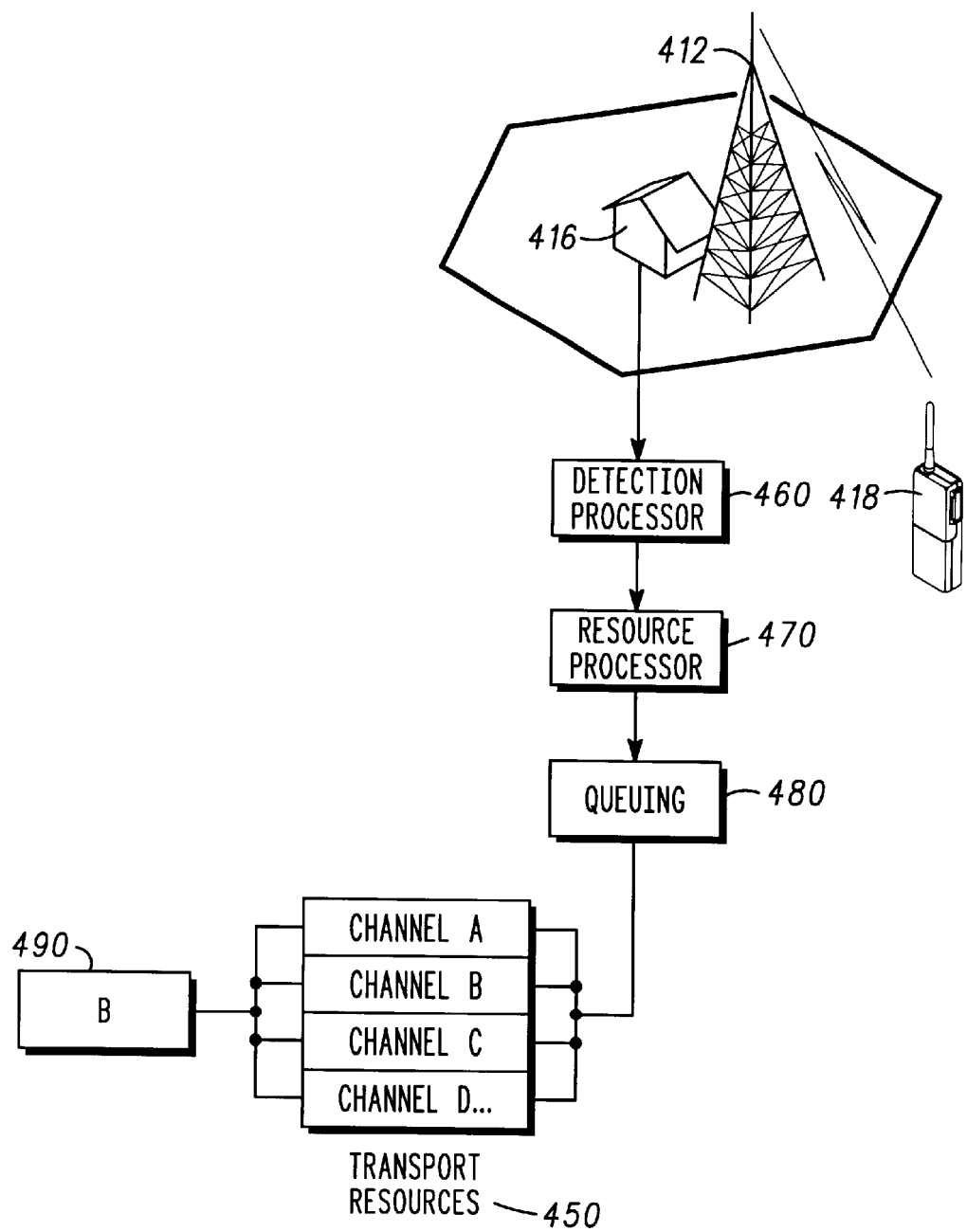
FIG. 4 is a schematic diagram illustrating a system embodiment of the present invention.

A preferred embodiment of a system of the present invention is shown in FIG. 4. As shown in the figure, radio unit 418 is capable of transmitting signals representing a request for a call or communication session to an interfacing station 412 and a receiving station 416. The receiving station 416 preferably is configured with processors to implement overbooking of the transport resources required to transmit a request for a call or a communication session via allocated transport resources 450. In the alternative, the processors may be installed or implemented in other remote locations within the radio network, including within a more centralized area.

As shown in the figure, a detection processor 460 is in linked to the interfacing station 412 to preferably detect the incoming communication session request from the station 412. The detection processor 460 determines the parameters of the communication session that is requested, preferably including the type of session, the quality of service required or requested and the destination. A resource processor 471 is linked to the detection processor 460 and determines whether any of the transport resources 450 are available immediately to transport the communication session information to the destination location 490.

Finally, a queuing processor 480 links the resource processor 470 with the transport resources 450. The queuing processor 480 holds the communication session for prioritized allocation to the transport resources 450 within a primary queue. Communication sessions are held there and allocated to the transport resources 450 as they become available on a priority basis, based on the quality of service required by the session and the availability of a particular set of resources for immediate use by the session.

This method and system provided herein may be utilized within fully distributed connection and transport systems for wireless networks or any other networks having channelized or allocatable resources. The system may of course be scaled for use with both smaller/cheaper and larger/higher-capacity systems than traditional centralized approaches based on zone controllers, DAPs, IVISCs or other similar controllers. Such distributed designs improve the system uptime and reliability and also eliminate an inherent single point-of-failure that may be present in centralized systems. The present embodiments may also support the decoupling of connection plane processing from service plane and transport plane processing.

Of course, it should be understood that a wide range of changes and modifications can be made to the preferred exemplary embodiments described above. Thus, it is intended that the foregoing detailed description be regarded as illustrative rather than limiting, and that it be understood that it is the following claims, including all equivalents, which are intended to define the scope of this invention.

What is claimed is:

1. A method of providing a connection for a communication session, said connection consisting of a portion of a set of transport resources, said method comprising the steps of:

receiving said communication session;

determining a quality of service required by said communication session;

determining whether a transport resource is available;

if a transport resource is available, granting said communication session to the available transport resource;

if a transport resource is not available and a threshold is not exceeded, queuing said communication session in a primary queue for assignment to a next available transport resource; otherwise, queuing said communication session in a secondary queue for assignment to said next available transport resource; and if a transport resource is not available and the threshold is exceeded and the quality of service is above a predetermined level, queuing said communication session in the primary queue for assignment to the next available transport resource.

2. The method of claim 1 further comprising the step of prioritizing said communication session within said primary queue in accordance with at least one of a quality of service level for said communication session and type of communication session.

3. A method of providing a connection for a communication session, said connection consisting of a portion of a set of transport resources, said method comprising the steps of:

receiving said communication session;

determining whether a transport resource is available;

if a transport resource is available, granting said communication session to the available transport resource; and if a transport resource is not available and a threshold is not exceeded, queuing said communication session in a primary queue for assignment to a next available transport resource; otherwise, queuing said communication session in a secondary queue for assignment to said next available transport resource, wherein the threshold is based on a maximum number of communication sessions allowed in said primary queue, and wherein said maximum number is a function of at least one of: the available transport resources in a particular network area, the available transport resources in any network area, a present number of other communication sessions being held in said primary queue at particular quality of service levels, and a measured quality of service from said transport resources.

4. A method for allocating transport resources for a communication session, said method comprising the steps of:

determining whether a transport resource is available;

if a transport resource is available, granting said communication session to the available transport resource; and if a transport resource is not available, determining a maximum number of communication sessions allowed in a queue, and queuing said communication session in the queue for assignment to a next available transport resource if the maximum number has not been exceeded, wherein said maximum number is a function of at least one of: the available transport resources in any network area, the available transport resources in a particular network area, a present number of other communication sessions being held in said queue at particular quality of service levels, and a measured quality of service from said transport resources.

5. The method of claim 4 further comprising the step of assigning a predetermined identifier corresponding to a quality of service level.

6. A system for allocating transport resources for a communication session, said system comprising:

a set of assignable transport resources within a communications network;

an interface for requesting a communication session using said communications network;

a resource processor in communication with said interface, said resource processor determining whether a transport resource within said network is available; and a queuing processor in communication with said resource processor, said queuing processor queuing said communication session in a primary queue for assignment to a next available transport resource if a transport resource is not available and a threshold is not exceeded, otherwise, queuing said communication session in a secondary queue for assignment to said next available transport resource, wherein the threshold is dependent on a quality of service required by said communication session.

7. The system of claim 6 wherein said set of assignable transport resources further comprise discrete radio channels.

8. The system of claim 6 wherein said set of assignable transport resources further comprise wire connections within a land-based telephone network.

9. The system of claim 6 further comprising a detection processor in communication with said interface, said detection processor being able to determine the quality of service required by said communication session.

10. The system of claim 9 wherein said detection processor, resource processor and queuing processor further comprise software operating on a computer.

11. A method of providing a connection for a communication session, said connection consisting of a portion of a set of transport resources, said method comprising the steps of:

receiving said communication session;

determining whether a transport resource is available;

if a transport resource is available, granting said communication session to the available transport resource; and if a transport resource is not available and a threshold is not exceeded, queuing said communication session in a primary queue for assignment to a next available transport resource;

otherwise, queuing said communication session in a secondary queue for assignment to said next available transport resource, wherein the threshold is dependent on a quality of service required by said communication session.

12. The method of claim 11 wherein the threshold is based on a maximum number of communication sessions allowed in said primary queue.

13. The method of claim 11 further comprising the step of assigning an identification code to said communication session, said identification code being indicative of parameters of said communication session and quality of service.

14. The method of claim 13 wherein said step of prioritizing said communication session includes comparing said identification code with identification codes of said other communication sessions within said primary queue.

15. The method of claim 11 wherein said transport resource comprises a discrete radio channel within a radio communications network.

16. The method of claim 11 wherein communication sessions within said primary queue are assigned transport resources before communication sessions within said secondary queue.

17. The method of claim 11 further comprising the step of determining a quality of service required by said communication session.

18. The method of claim 11 further comprising the step of indicating to a requester of said communication session that said communication session is granted when queued in the primary queue.

19. The method of claim 11 further comprising the step of prioritizing said communication session within said primary queue in accordance with at least one of a quality of service level for said communication session and type of communication session.

20. A method for allocating transport resources for a communication session, said method comprising the steps of:

determining whether a transport resource is available;

if a transport resource is available, granting said communication session to the available transport resource; and if a transport resource is not available, determining a maximum number of communication sessions allowed in a queue, and queuing said communication session in said queue for assignment to a next available transport resource if the maximum number has not been exceeded, wherein the maximum number is dependent on a quality of service required by said communication session.

21. The method of claim 20 further comprising the step of, if a transport resource is not available, queuing said communication session in a secondary queue for assignment to a next available transport resource if the maximum number has been exceeded.

22. The method of claim 21 wherein communication sessions within said queue are assigned transport resources before communication sessions within said secondary queue.

23. The method of claim 20 wherein the step of queuing said communication session in said queue comprises prioritizing the communication session in accordance with at least one of a quality of service level for said communication session and type of communication session.

24. The method of claim 20 further comprising the step of determining a quality of service required by said communication session.

25. The method of claim 20 further comprising the step of indicating to a requester of said communication session that said communication session is granted when queued in the queue.

26. A method of providing a connection for a communication session, said connection consisting of a portion of a set of transport resources, said method comprising the steps of:

receiving said communication session;

determining whether a transport resource is available;

if a transport resource is available, granting said communication session to the available transport resource; and if a transport resource is not available and a threshold is not exceeded, queuing said communication session in a primary queue for assignment to a next available transport resource; otherwise, queuing said communication session in a secondary queue for assignment to said next available transport resource, wherein a communication session queued in the primary queue borrows a transport resource granted to a second communication session when a temporary loss of traffic is detected for the second communication session.

27. A method for allocating transport resources for a communication session, said method comprising the steps of:

determining whether a transport resource is available;

if a transport resource is available, granting said communication session to the available transport resource; and if a transport resource is not available, determining a maximum number of communication sessions allowed in a queue, and queuing said communication session in the queue for assignment to a next available transport resource if the maximum number has not been exceeded, wherein a communication session queued in the queue borrows a transport resource granted to a second communication session when a temporary loss of traffic is detected for the second communication session.

* * * * *